United States Patent [19]
Goodman et al.

[11] Patent Number: 5,526,146
[45] Date of Patent: Jun. 11, 1996

[54] BACK-LIGHTING SYSTEM FOR TRANSMISSIVE DISPLAY

[75] Inventors: Douglas S. Goodman, Yorktown Heights; Rodney T. Hodgson, Ossining; James S. Lipscomb, Yorktown Heights; Michael M. Loy, Mount Kisco; Robert H. Wolfe, Jr., Yorktown Heights, all of N.Y.

[73] Assignee: International Business Machines Corporation, Armonk, N.Y.

[21] Appl. No.: 82,002

[22] Filed: Jun. 24, 1993

[51] Int. Cl.$^6$ .......................... G02F 1/1335; H04N 9/47
[52] U.S. Cl. .............................. 359/40; 348/54
[58] Field of Search .................. 359/40, 464, 472, 359/475, 49; 348/42, 51, 53, 56, 57, 54, 55

[56] References Cited

U.S. PATENT DOCUMENTS

| | | | |
|---|---|---|---|
| 3,959,580 | 5/1976 | Chocol et al. | 178/6.5 |
| 4,185,895 | 1/1980 | Stephens et al. | 350/345 |
| 4,298,249 | 11/1981 | Gloor et al. | 350/338 |
| 4,528,587 | 7/1985 | Jones, Jr. | 358/92 |
| 4,571,616 | 2/1986 | Haisma et al. | 358/88 |
| 4,575,207 | 3/1986 | August | 354/112 |
| 4,649,425 | 3/1987 | Pund | 358/88 |
| 4,660,936 | 4/1987 | Nosker | 350/339 |
| 4,704,004 | 11/1987 | Nosker | 350/345 |
| 4,756,604 | 7/1988 | Nakatsuka et al. | 350/331 R |
| 4,874,228 | 10/1989 | Abo et al. | 350/345 |
| 4,922,336 | 5/1990 | Morton | 358/88 |
| 4,933,755 | 6/1990 | Dahl et al. | 358/88 |
| 4,936,657 | 6/1990 | Tejima et al. | 350/331 |
| 4,936,659 | 6/1990 | Anderson et al. | 350/339 |
| 4,959,641 | 9/1990 | Bass et al. | 340/700 |
| 4,963,959 | 10/1990 | Drewlo | 358/88 |
| 4,987,487 | 1/1991 | Ichinose et al. | 358/92 |
| 5,007,715 | 4/1991 | Verhulst | 350/334 |
| 5,012,351 | 4/1991 | Isono et al. | 358/342 |
| 5,128,783 | 7/1992 | Abileah et al. | 359/49 |
| 5,151,821 | 9/1992 | Marks | 359/462 |
| 5,161,041 | 11/1992 | Abileah et al. | 359/40 |
| 5,177,616 | 1/1993 | Riday | 358/254 |
| 5,262,928 | 11/1993 | Kashima et al. | 359/49 |
| 5,311,220 | 5/1994 | Eichenlaub | 348/55 |

FOREIGN PATENT DOCUMENTS

| | | |
|---|---|---|
| 0239007 | 3/1987 | European Pat. Off. ........ G03B 21/00 |
| 0366462 | 5/1990 | European Pat. Off. . |
| 0402146 | 12/1990 | European Pat. Off. . |
| 91/18315 | 11/1991 | WIPO . |
| WO92/11735 | 7/1992 | WIPO ............................ H04N 13/04 |

OTHER PUBLICATIONS

"Flat–Panel Displays" Scientific American Mar. 1993 p. 90 S. W. Depp et al.
IBM TDB vol. 36 No. 3 Mar. 93 p. 45 "Fore–Screen Display and Manipulation for Virtual World Interaction" D. T. Ling et al.

*Primary Examiner*—William L. Sikes
*Assistant Examiner*—Charles Miller
*Attorney, Agent, or Firm*—Jeffrey L. Brandt; Ronald L. Drumheller

[57] ABSTRACT

A display assembly includes a display screen having a predetermined generally planar area for displaying transmissive data. A light source is provided for generating light of predetermined intensity, and a circular Fresnel lens is disposed between the light source and the display means, the circular Fresnel lens imaging the light source through the display means and onto an opposite side of the display means. A diffuser is disposed between the light source and the display means for diffusing the light. The intensity of the light source is selected to be appropriate for direct human viewing of the transmissive data.

25 Claims, 13 Drawing Sheets

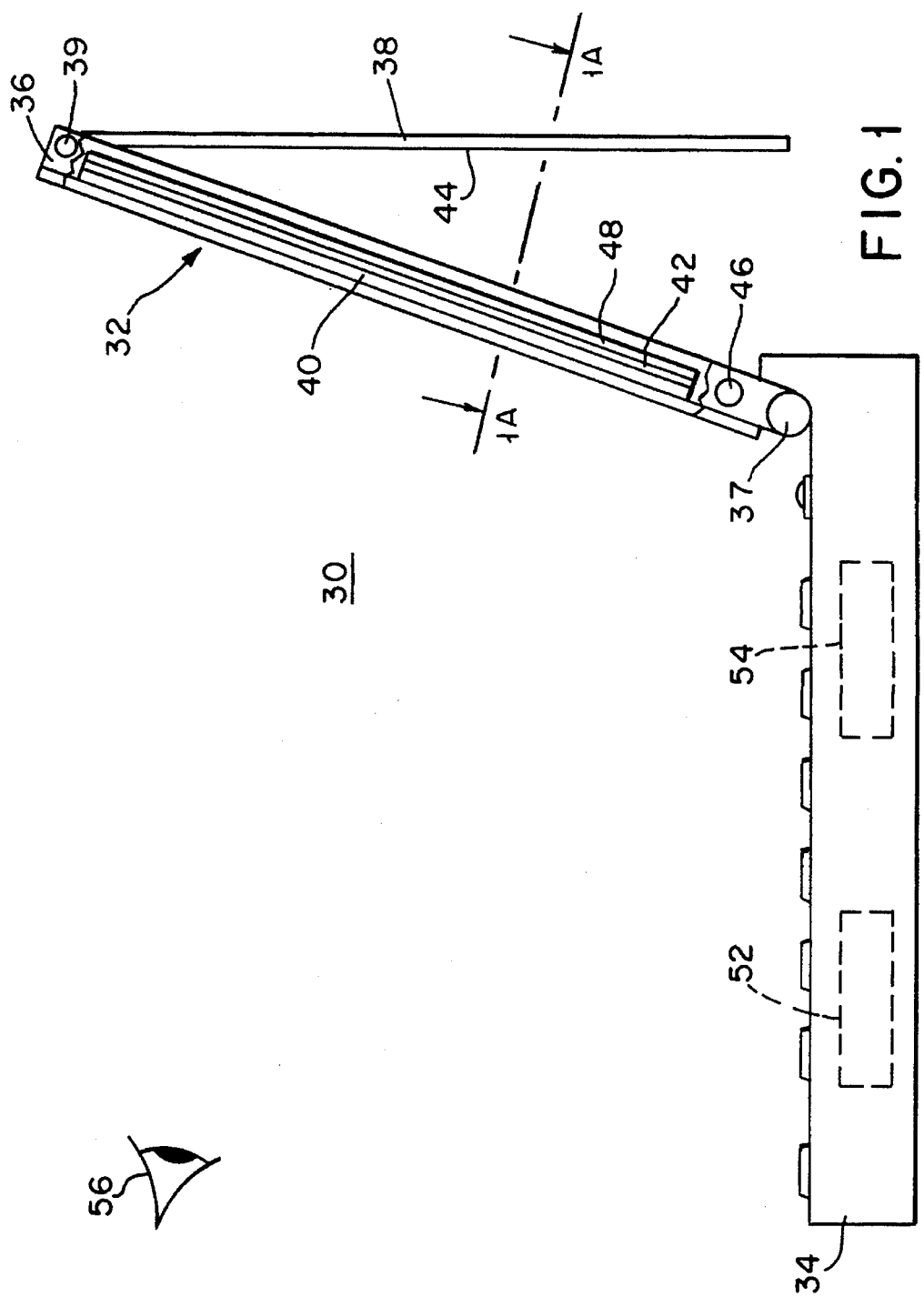

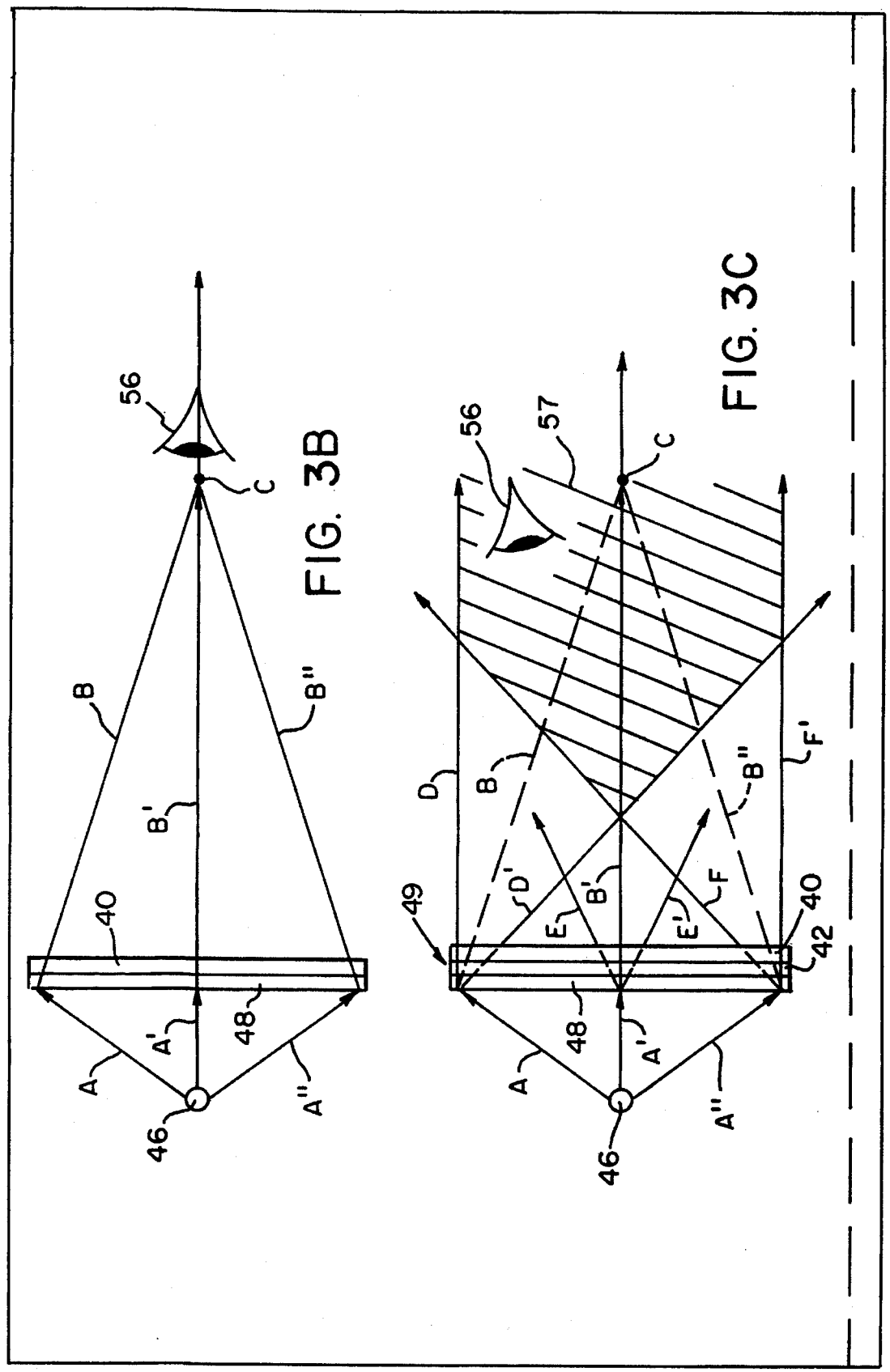

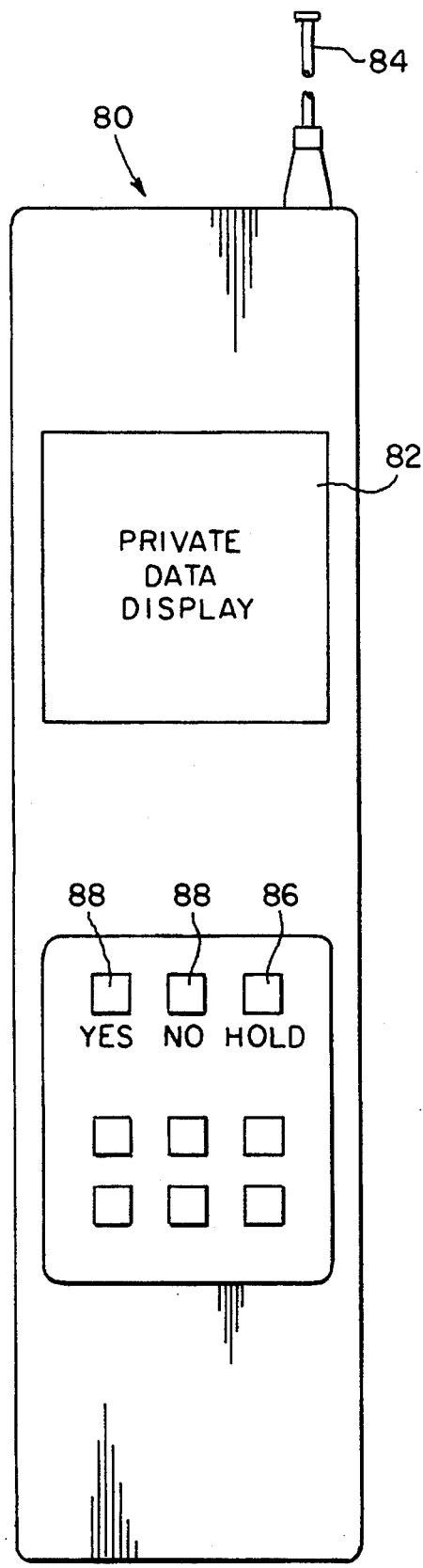
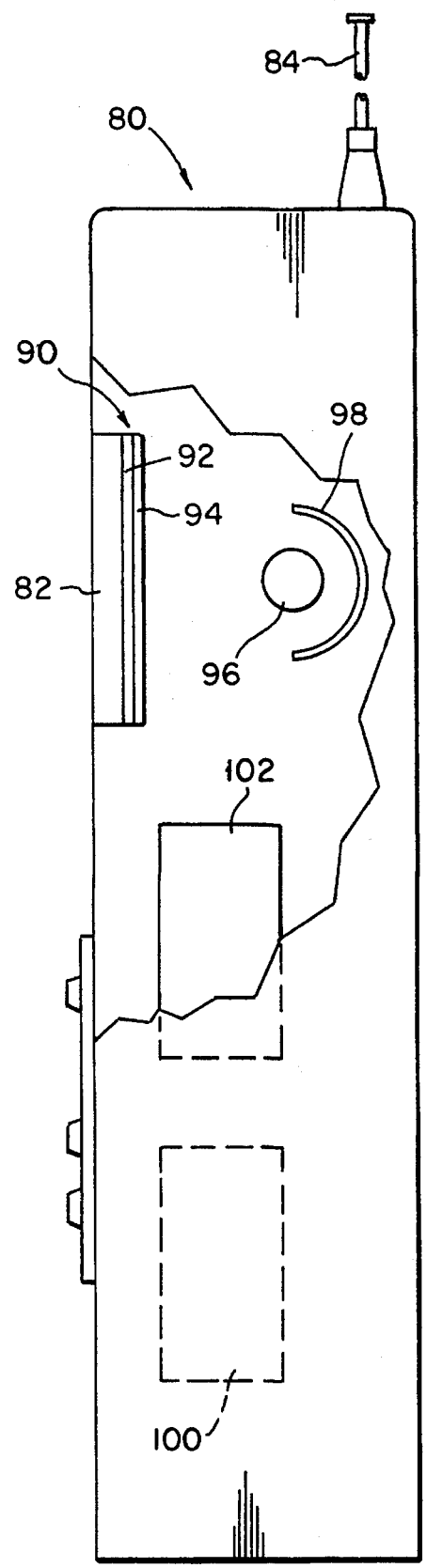
FIG. 7
FIG. 7A

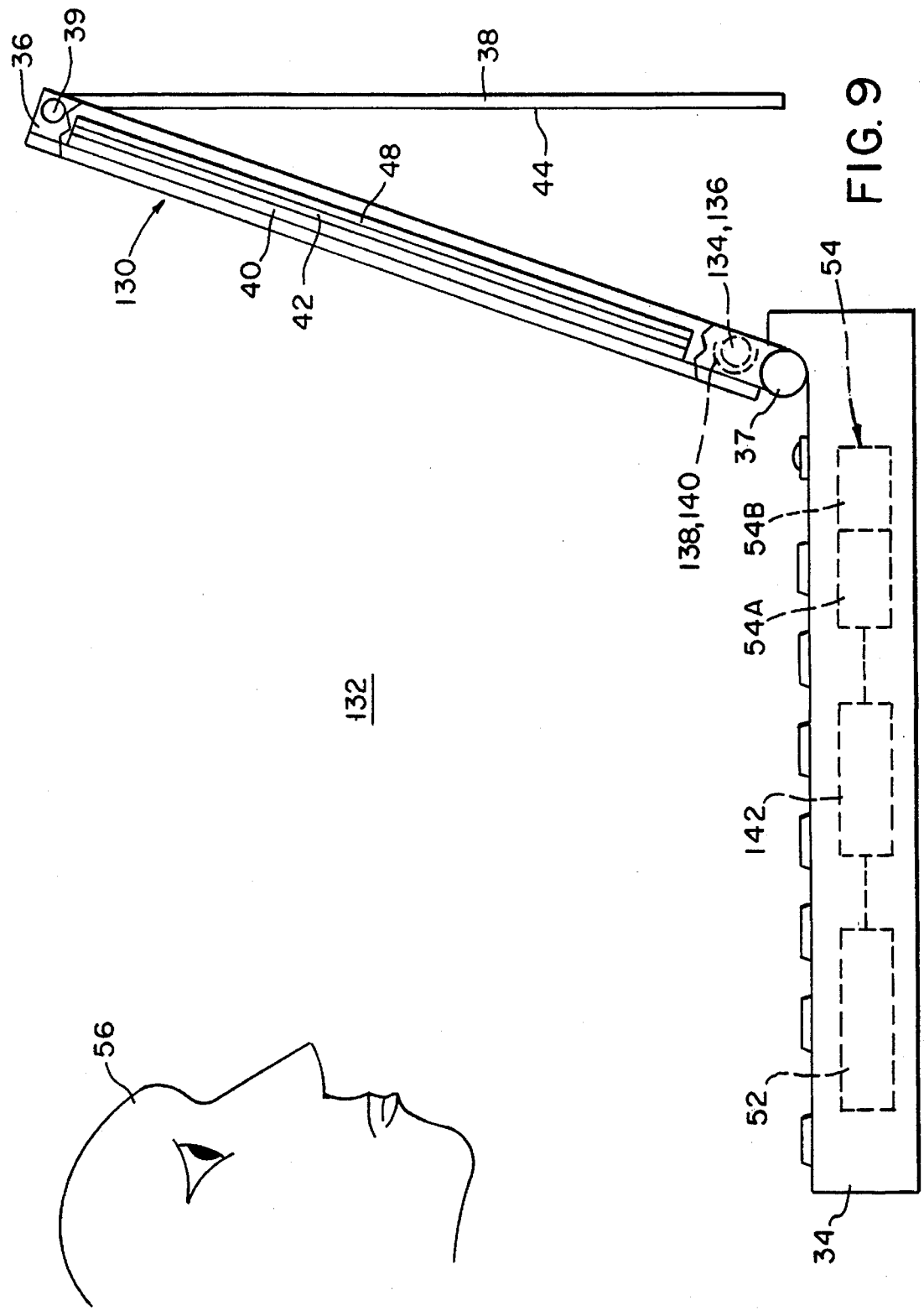

BACK-LIGHTING SYSTEM FOR TRANSMISSIVE DISPLAY

FIELD OF THE INVENTION

The present invention relates generally to transmissive data displays, and more particularly to a back-lighting system for a liquid crystal display.

BACKGROUND OF THE INVENTION

In the field of liquid crystal displays (LCDs), substantial resources have been expended to provide bright screen displays having high-resolution and wide viewing angles. Generally, the brighter the LCD display, the higher the resolution, and the wider the viewing angle through which the display is visible, the better the display is considered to be. This is generally true, for example, in the fields of laptop computers and LCD televisions.

Much research has thus gone into developing bright, wide-angle, high-resolution LCD displays, such as the color displays found on laptop computers like the IBM CL57SX. These LCD displays are of excellent quality when measured against the desirable characteristics mentioned above. They also require significant amounts of power to function, yielding relatively short viewing times of about one hour when battery-powered for portable use.

Set out below are several examples of LCD displays including back-lighting systems selected to collimate light projected through the displays, making the displays more efficient.

U.S. Pat. No. 4,704,004 to Nosker shows a light box incorporating a reflector, a linear Fresnel lens, polarizers and a diffuser, for collimating light to uniformly illuminate a liquid crystal display. The collimated light is projected through the LCD display, and the diffuser is positioned as desired to widen the viewing angle.

U.S. Pat. No. 4,874,228 to Aho et al. shows a backlit display including a lens structured to reflect narrow-angle-incident light at 90° to the angle of incidence. At least one light source is positioned to provide light at a narrow angle of incidence. This light is reflected at a 90° angle, projecting an essentially collimated beam through an adjacent LCD display.

In contrast to systems utilizing uncollimated light, the patents described above to Nosker and Aho et al. utilize collimated back-lighting systems to improve the brightness and thus the efficiency of LCD displays. However, even these collimated back-lighting systems have substantial power requirements and limited battery time in portable operations.

In addition to limiting power consumption while maintaining screen brightness, in many applications it is desirable to provide a bright screen and high-resolution while providing a limited viewing area (i.e. a narrowed viewing angle). Such applications include those in which privacy is desirable, for example during the use of a data entry touch-screen such as an automatic teller machine (ATM) typically found at banks. Other uses include, for example, private operation of notebook computers in public areas, and private viewings of movies or other entertainment media in similarly public viewing places.

OBJECTS OF THE INVENTION

One object of the present invention is to provide a new and improved transmissive data display.

Another object of the present invention is to provide such a display having high brightness and resolution.

Yet another object of the present invention is to provide such a display wherein the illumination area and hence viewing angle can be limited to provide private viewing.

A further object of the present invention is to provide such a display which is compact in size.

Another object of the present invention is to provide such a display which has relatively low power requirements in comparison to conventional transmissive data displays.

Yet another object of the present invention is to provide such a display adapted for displaying stereo-optic or three-dimensional objects and scenes.

Yet a further object of the present invention is to provide such a display which is easily adaptable to many different applications, including, for example, computer displays and movie or other media displays.

Another object of the present invention is to provide such a display which is readily adapted for use with a conventional LCD panel.

A further object of the present invention is to provide such a new and improved display which can be fabricated using conventional, cost-effective optical components.

SUMMARY OF THE INVENTION

In accordance with one aspect of the present invention, there is provided a display assembly including a display screen having a predetermined area for transmissively displaying data. A light source is provided for generating light of predetermined intensity, and optical imaging means are provided between the light source and the display means for imaging the light source through the display means onto the opposite side of the display means. The intensity of the light source is selected appropriate for direct human viewing of the transmissive data.

The light is preferably diffused before being imaged through the display screen, which may comprise, for example, a liquid-crystal display panel.

The imaging can be performed using a positive lens, and particularly desirable is a circular Fresnel lens.

The display assembly is adaptable for use in a portable, battery-powered computer, as it provides the advantages of low power consumption, and optionally private viewing. The assembly is also readily adaptable for many other applications using a transmissive display, including, for example, portable communication devices and various media displays such as those found in video games or for passenger viewing in airplanes.

In another embodiment of the invention, multiple light sources are provided, along with separate left- and right-eye data. The focusing effect of the Fresnel lens is utilized to provide stereo-optic, or 3-D, viewing. When the invention is used with a position detector and lamp-selecting switch, it operates to provide stereo-optic viewing to a human viewer at different positions.

In accordance with yet another embodiment of the invention, there is provided a method for displaying data, including the step of transmissively displaying the data. A light source of predetermined intensity is provided, and the light source is imaged through the transmissive data onto the opposite side of the transmissive data. The intensity of the light source is selected to be appropriate for direct human viewing of the transmissive data.

The light is preferably diffused before being imaged through the transmissive display, the latter comprising, for example, a liquid-crystal display.

The imaging means can comprise a positive lens, and preferably a Fresnel lens.

Multiple light sources can be provided, in combination with synchronized left- and right-eye data, whereby to use the focusing effects of the Fresnel lens to provide stereo-optic or 3D viewing. In combination with a position sensor, the multiple light sources may be activated to provide the stereo-optic image to a human viewer at changing positions.

DESCRIPTION OF THE DRAWINGS

These and other objects, features and advantages of the present invention will become apparent from a consideration of the following Detailed Description of the Invention, when considered with the drawing Figures, in which:

FIG. 1 is a side view, partly schematic, of a portable computing system including a display assembly constructed in accordance with the present invention;

FIG. 3B is a diagrammatic view of the Fresnel lens and LCD panel of FIG. 1, showing the optical focusing effect of the lens;

FIG. 3C is a diagrammatic view similar to that of FIG. 3B and further including the diffuser of FIG. 1 to illustrate the optical effects of the system including the diffuser;

FIG. 7 is a front view of a personal communications device incorporating the display assembly of the present invention;

FIG. 7A is a side view of the personal communications device of FIG. 7, partially cut away to illustrate the display assembly;

FIG. 9 is a side view, partly schematic, of another alternate embodiment of the present invention;

DETAILED DESCRIPTION OF THE INVENTION

Figure 1A:
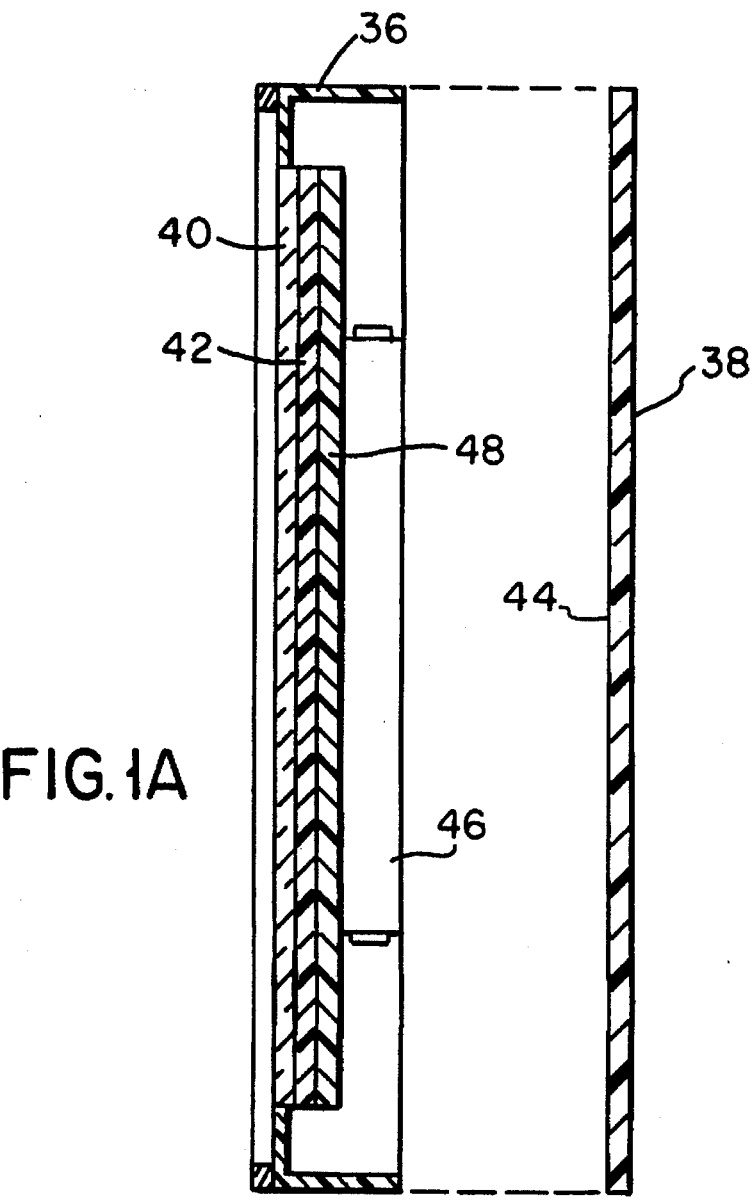
FIG. 1A is a sectional view, taken along line 1A—1A of FIG. 1, showing only the components of the display assembly.

Referring now to the drawings, FIG. 1 shows a portable computing system 30 including an LCD display assembly 32 pivotally mounted on a keyboard-supporting base 34. Display assembly 32 includes a support frame 36 pivotally mounted to base 34 via a pivoting hinge 37. A rear cover 38 is similarly pivotally mounted to frame 36 via a pivoting hinge 39. Frame 36 supports a thin-film transistor (TFT), color LCD panel 40 substantially centered within the frame and open to the front over base 34 for human viewing. In the present embodiment, LCD panel 40 is 8" in width by 6" in height.

Side and bottom panels for display 32, i.e. the panels spanning frame 36 and cover 38, comprise for example flexible bellows or fan-type plastic plates, and have been omitted to better illustrate the present invention.

Continuing with further reference to FIG. 1A, a light diffuser 42 is mounted on the inner, back surface of LCD panel 40. Diffuser 42 is selected to have small-angle scattering characteristics, discussed in further detail below, and is sized to cover the entirety of the back surface of LCD panel 40.

A reflective, mirrored surface 44 is disposed on the inner surface of rear cover 38.

A light source 46 is positioned inside of frame 36, generally beneath LCD panel 40. Light source 46 preferably comprises a straight (as shown), or U-shaped (not shown) fluorescent tube, having a linear length (a folded length, in the case of the U-shaped tube) in the range of ½ to ¾ the width of LCD panel 40, and is positioned to be centered beneath the bottom edge of the panel.

Figure 2:
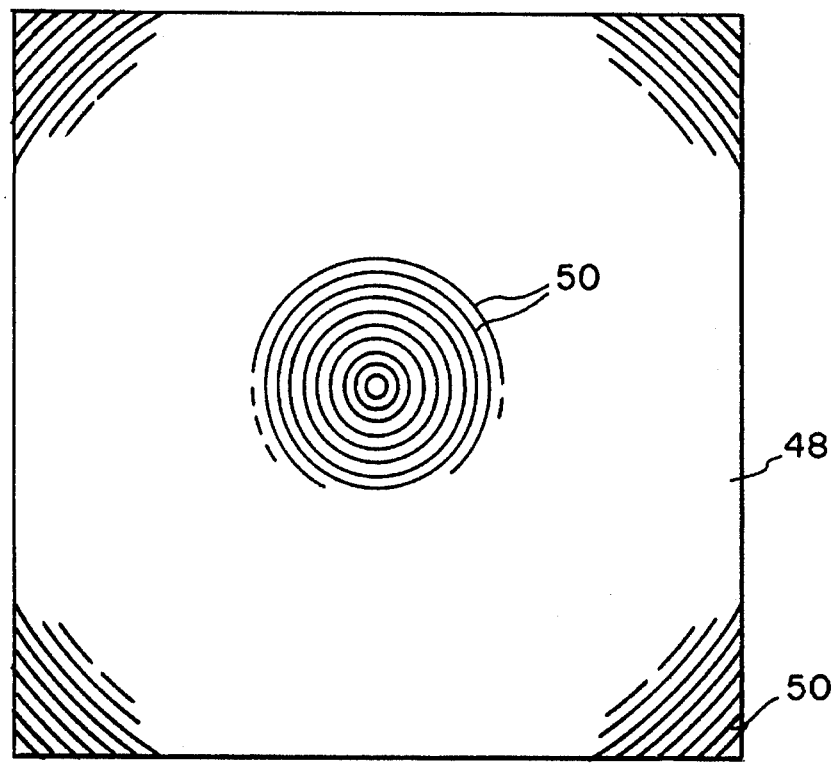
FIG. 2 is a plan view of the Fresnel lens of FIG. 1.

A positive Fresnel lens 48 is positioned inside of display assembly 32, overlying the back surface of diffuser 42. With reference to FIG. 2 Fresnel lens 48 is seen to be circular, that is, supporting concentric, circular rings of focusing prisms 50 on one surface thereof. While Fresnel lens 48 is said to be 'circular' because of its circular focusing rings and circular focusing effect, the overall shape of the lens is rectangular, and is selected to be at least of equal size to LCD panel 40. As is described in further detail below, Fresnel lens 48 operates so as to form an image of light source 46 on the viewing side of LCD panel 40. Frame 36 and Fresnel lens 48 may optionally be provided such that the lens is readily removable from display assembly 32.

Power supply means such as a battery 52, and LCD panel drive electronics 54, are contained in base 34 and connected to LCD display 32 in a known manner. Such power supply means and drive electronics are conventional components associated with LCD display systems. Other conventional components of a computing system are, for purposes of brevity, not discussed herein.

Figure 3A:
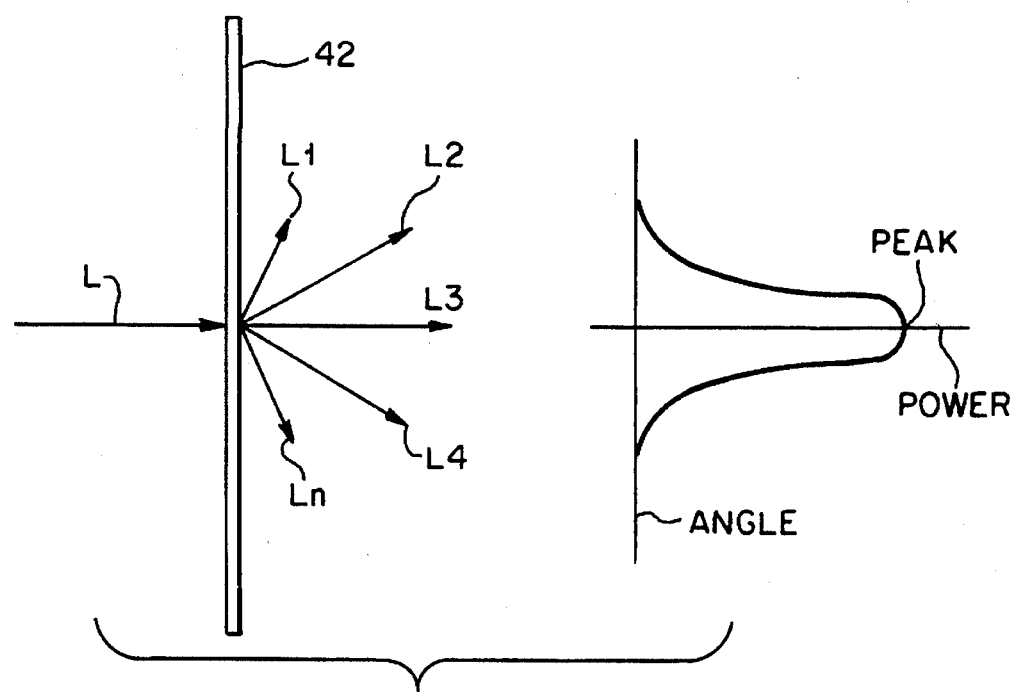
FIG. 3A is a side view of the diffuser of FIG. 1, including a graph illustrating its small-angle scattering characteristics.

Describing now the optical characteristics of display assembly 32, FIG. 3A illustrates the small-angle, angular scattering distribution (A.S.D.) of diffuser 42. More specifically, an incident light ray L is scattered into multiple, angular rays $L_1$–$L_n$. As shown in the accompanying graph of power versus angle, the light passing through diffuser 42 is non-uniform in intensity, having a generally bell-shaped distribution with a peak on the axis of light ray L. As is further discussed below, diffuser 42 functions to ease or smooth the incident light, and is selected to have an A.S.D. sufficiently broad to eliminate the moire pattern that might otherwise be formed between Fresnel lens 48 and LCD panel 40. Again as is further discussed below, the A.S.D. and position of diffuser 42 are selected depending on the desired illumination and viewing characteristics for display assembly 32.

With reference now to FIG. 3B, for purposes of best illustrating the present invention, the operation of display assembly 32 is first described with reference to light source 46, Fresnel lens 48, and LCD panel 40. Diffuser 42 is omitted, and light source 46 is shown directly illuminating Fresnel lens 48. (While, for explanatory purposes reflecting surface 44 is omitted, it will be understood that operation with the reflecting surface is substantially identical.)

Examining FIG. 3B, Fresnel lens 48 is selected so as to focus divergent incident light rays A, A', A" from lamp 46, into focused rays B, B', B", forming an image of the light source at a focal point C. While the focusing effect of Fresnel lens 48 has been illustrated in two dimensions, it will be understood that, as with any positive lens, focusing occurs in all three dimensions to provide the image at point C. Fresnel lens 48 is preferably selected to have a focal length in the range of from 15–20 cm.

Still with reference to FIG. 3B, the optical system thus shown including Fresnel lens 48 is seen to have a very narrow viewing region. That is, a viewer 56 will have to position his or her eye directly at focal point C, or narrowly within the viewing envelope outlined by light rays B, B", in order to view LCD panel 40 as illuminated by light source 46. Without a diffuser, human viewer 56 is likely to see an undesirable moire pattern established between Fresnel lens 48 and LCD panel 40.

It is important to note, and key to the understanding of the present invention, that Fresnel lens 48 functions to image only light source 46, and not LCD panel 40. Thus, the back-lighting system comprising lamp 46 and Fresnel lens 48 functions only to illuminate LCD panel 48, and not to image or otherwise optically modify the LCD panel display data. Thus, the viewable resolution of the system shown and described in FIG. 3B is determined by the inherent resolution of LCD panel 40, and not by Fresnel lens 48.

With reference to FIG. 3C, the optical system of FIG. 3B is shown, now further including diffuser 42 positioned between LCD panel 40 and Fresnel lens 48 (i.e. the configuration shown in FIG. 1). This back-lit display system, including diffuser 42, light 46, LCD panel 40, and Fresnel lens 48 is generally indicated as 49.

In the optical system shown in FIG. 3C, the angular scattering performed by diffuser 42 (as illustrated in FIG. 3A) functions to spread out and smooth the incident light rays, including rays A, A', A". Examining FIG. 3C, diffuser 42 is seen to spread (or diffuse) incident ray A over the angle delineated by rays D-D'. This angle is, of course, determined by the A.S.D. characteristics of diffuser 42, as well as the position of the diffuser relative to Fresnel lens 48. In a similar manner, incident rays A' and A" are spread across the regions delineated by rays E-E' and F-F', respectively.

This smoothing results in a substantially larger area of illumination than that described with reference to FIG. 3B above, resulting in a broader viewing angle. More specifically, a viewer 56 positioned anywhere within the illuminated area bounded by rays D, F', and forward of rays D', F, will be able to view illuminated LCD panel 40. To clearly indicate the greatly increased viewing region provided by backlighting system 49 of FIG. 3C, it is indicated by shading 57.

Figure 3D:
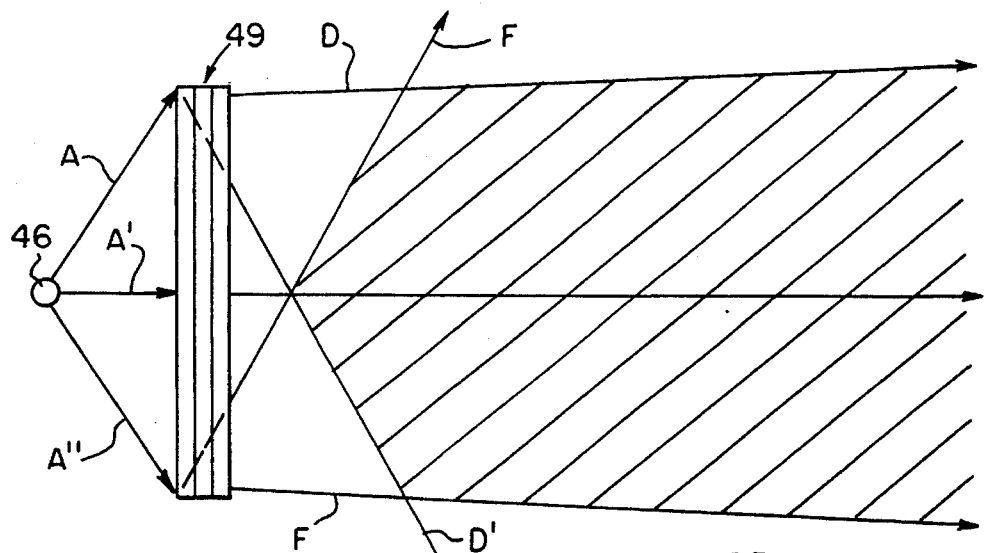
FIGS. 3D, 3E, 3F are diagrammatic views of the back-lit display system of FIG. 3C illustrating different illumination characteristics which may be obtained using the present invention.
Figure 3E:
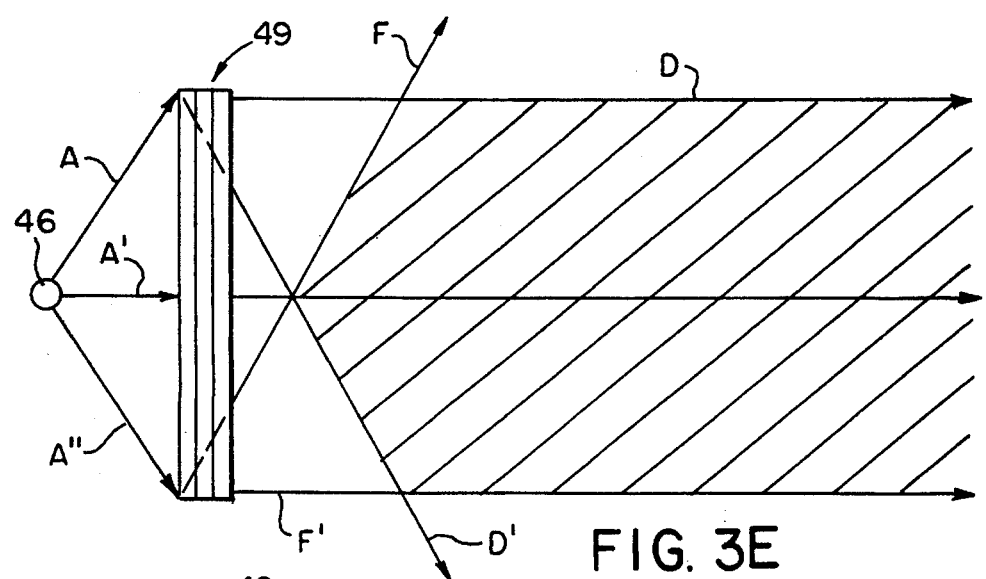
Figure 3F:
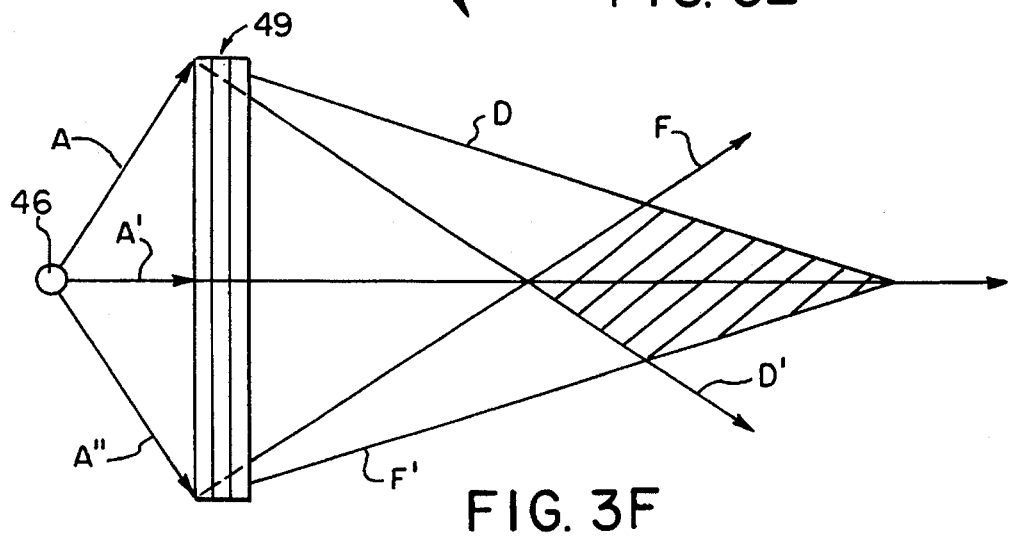

It will be understood that the selection of the A.S.D. for diffuser 46, as well as the position and spacing of the diffuser and Fresnel lens 48 relative to each other and to LCD panel 40, will control the region of illumination indicated by shading 57. This viewable region of illumination 57, can be selected in a straightforward manner to be diverging from the edges of LCD panel 40 as shown in FIG. 3D, substantially collimated with the edges of the panel as shown in FIG. 3E, or narrowed and restricted in the manner shown in FIG. 3F. Even with a narrowed viewing angle as shown in FIG. 3F, diffuser 42 functions to remove any visible moire pattern, and to smooth the light for easier viewing.

In the operation of computing system 30, data is displayed transmissively on LCD panel 40 responsive to electronic signals from circuit 54. Power source 52 is used to activate lamp 46, causing divergent light to illuminate the interior of display assembly 32. This divergent light is reflected off of mirrored surface 44, through Fresnel lens 48 and diffuser 42. LCD panel 40 is thus illuminated and viewable in the manner described with respect to FIGS. 3A–3F above.

The present inventors have discovered that, using a back-lighting system including lamp 46, Fresnel lens 48, and diffuser 42 in the manner described above, LCD panel 40 is displayed with very high brightness while utilizing lamp power in the range of one-tenth (1/10) that typically required to obtain the same brightness without the present invention. Further, the relative characteristics and position of the back-lighting components can be straightforwardly selected to control the region of illumination, and hence the viewing angle and region, of display assembly 32. Lamp and thus total power consumption is even further reduced as the illumination region is narrowed. Because the back-lighting system functions only to illuminate LCD panel 40, and not to image the panel, the viewing resolution is determined only by the resolution of the panel, and not by the quality of the Fresnel lens.

Figure 4:
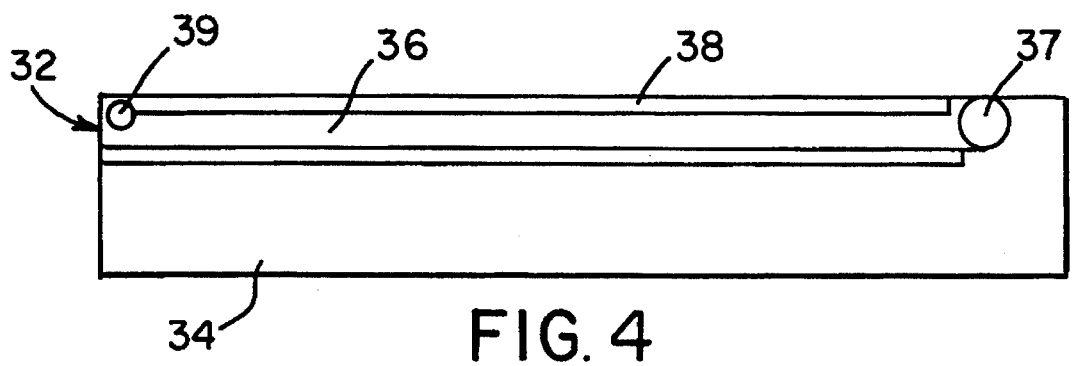
FIG. 4 is a side view of the portable computing system of FIG. 1, with the case in a closed position.

With reference to FIG. 4, computing system 30 is shown with display assembly 32 in a folded, closed position. In this position, cover 38 has been pivoted at hinge 39 to close onto the back of frame 36. Frame 36 has been likewise pivoted about hinge 37 to close against base 34. The resultant package is compact and secure for storage or transportation.

There is thus described above a computing system with a new and improved LCD display assembly 32. This LCD display assembly utilizes a back-lighting system including a lamp 46, a Fresnel lens 48 and diffuser 44 to provide a bright, human-viewable display requiring substantially decreased power consumption in comparison to the prior art. Where desired, a restricted illumination region, and hence a restricted viewing angle and decreased viewing region, can be provided for private viewing and even lower power consumption. The present inventors have determined that, with a display assembly of the type described above, brightness, sharpness, and resolution equal to conventional, wide-angle LCD display assemblies can be obtained, using about one-tenth (1/10) or less of the power necessary to run conventional display assemblies, resulting in a power reduction of about one-third to one-half (1/3–1/2) for the total system. Thus, for power-sensitive applications such as battery-operated, portable computing systems, battery life can be extended by a factor of at least two (2X) in duration.

Another significant advantage of the present invention is that of providing the private viewing display. With the use of the Fresnel lens and diffuser to provide restricted illumination and viewing regions, the display can be viewed in close proximity to others, with the display information being private to the viewer. As will be discussed below, the present invention permits a variety of applications, desirably requiring privacy, which were not heretofore practical with conventional transmissive data display systems.

While the invention has so far been described with respect to a specific embodiment, many different variations and configurations will become apparent. At this time, the function of, and selected alternatives for, several of the display assembly components will be discussed.

Discussing first the use of positive Fresnel lens 48, the purpose of this optical component is to provide an image of light source 46. Other components which accomplish this same function can be substituted for the Fresnel lens. More specifically, a conventional positive lens of sufficient size to function with LCD panel 40 can be substituted for Fresnel lens 48. While such a lens may be too large for practical incorporation into a portable computer, it may be perfectly sufficient for other applications where smaller displays are utilized and/or weight is not constrained. Similarly, a focusing mirror may be used instead of Fresnel lens 48 with the same effect.

With reference to display 40, substantially any transmissive data display can be substituted for the TFT LCD display described above. The only requirement is that the display be of the transmissive type—i.e. that the data image on the display be made human-visible by back-lighting.

Discussing now the illumination system including lamp 46, reflector 44, and diffuser 42, the function performed by this system is that of providing substantially uniform light, of appropriately human-viewable intensity, for imaging by Fresnel lens 48 through transmissive LCD panel 40. Lamp 46 with reflector 44 functions to provide a light source, and may be substituted, for example, by direct lighting, a conventional aperture lamp, or other appropriate configurations of lamps and reflectors. Diffuser 44 functions to smooth the incident light in the manner described above with respect to FIG. 3A.

While the above embodiment of display assembly 32 is shown implemented in a portable computer, it may be used in many other applications. More specifically, the electronic components for operating display assembly 32, including power source 52 and drive electronics 54, are not particular to a computing system. They are conventional components which may be implemented in many different environments requiring a display assembly. Other applications for display assembly 32 are illustrated below.

Figure 5:
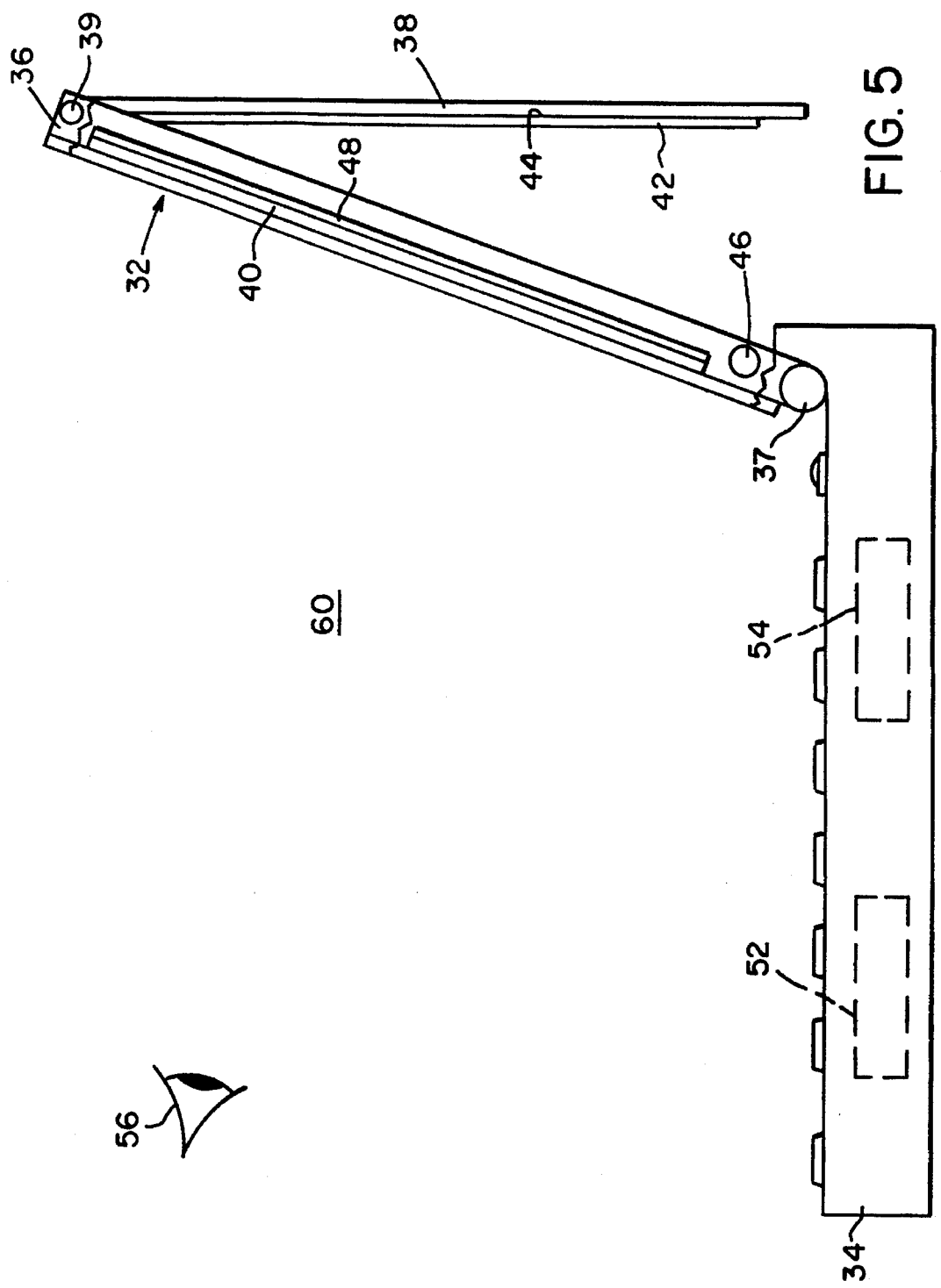
FIG. 5 is a side view, partly schematic, of an alternate embodiment of the invention.

Referring now to FIG. 5, an alternate embodiment 60 of the portable computing system of FIG. 1 is shown, wherein like elements are indicated by like reference numbers. In this embodiment of the invention, diffuser 42 is positioned on the inner surface of back cover 38 over mirrored surface 44. Fresnel lens 48 is positioned directly on the back surface of LCD panel 40.

The operation of display assembly 32 of computing system 60 is substantially identical to that described with respect to computing system 30 above. As described above, the relative position and spacing between diffuser 42, Fresnel lens 48, and LCD panel 40 are selected to provide the desired viewing characteristics.

Figure 6:
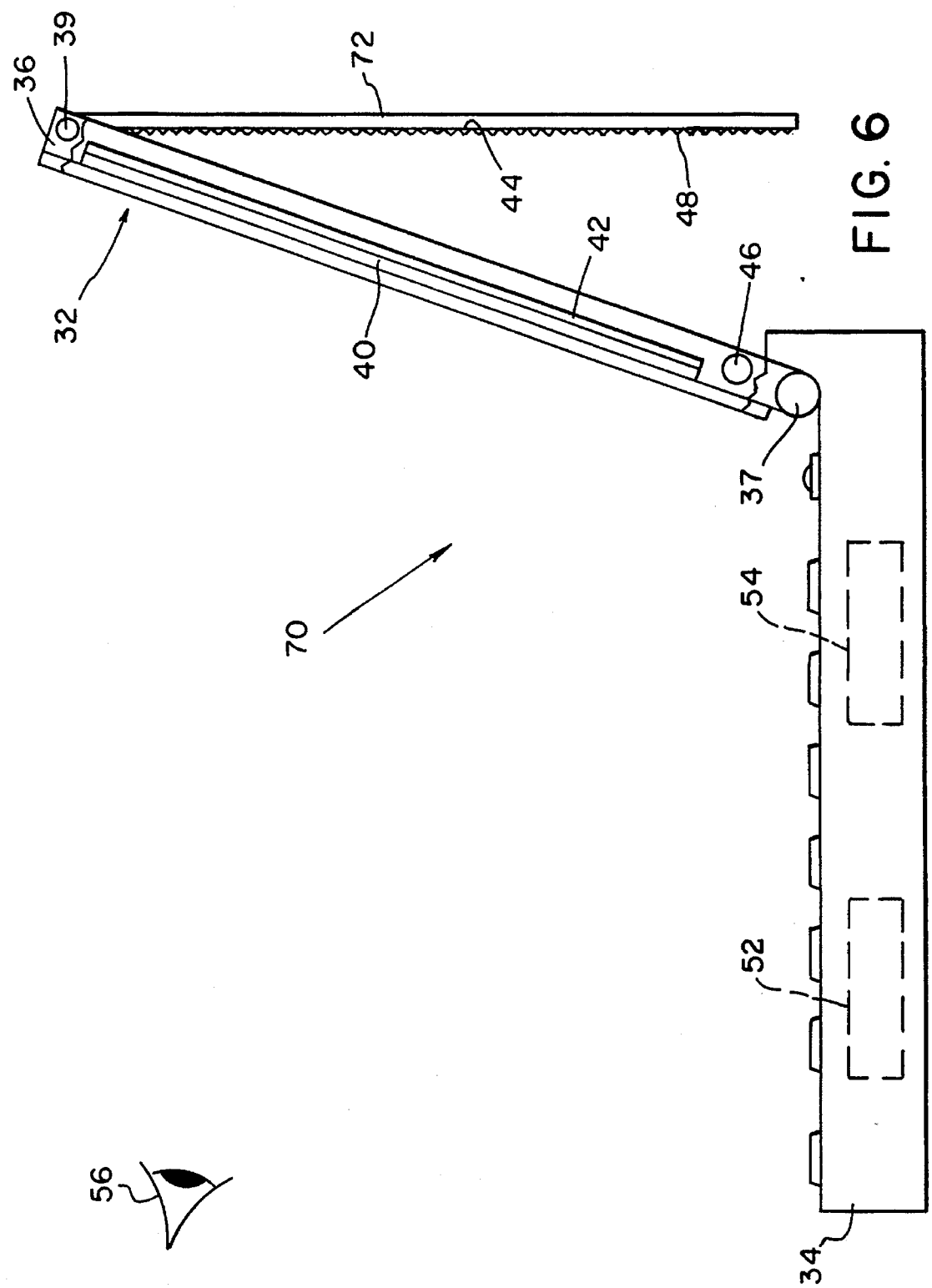
FIG. 6 is a side view, partly schematic, of another alternate embodiment of the invention.

With reference now to FIG. 6, another alternate embodiment 70 of the computing system 30 of FIG. 1 is shown, wherein like elements are again indicated by like reference numbers. In this embodiment, Fresnel lens 48 is integrated onto reflective surface 44 of a rear cover indicated here as 72. As in the embodiment of FIG. 1, diffuser 42 is positioned on the back surface of LCD panel 40. Alternatively, the diffusing characteristics of diffuser 42 may be integrated into Fresnel lens 48, integrating the Fresnel lens, diffusing, and reflecting elements into a single unit (not shown).

As with the embodiment of FIG. 5 above, the operation of display assembly 32 in portable computing system 70 is identical to that of the assembly described in FIG. 1. Again, the relative positions, spacing, and characteristics of the elements in display assembly 32 can be straight-forwardly selected to control the imaging of light through LCD display 40 and hence the display viewing characteristics.

It will be understood from a consideration of FIGS. 5 and 6, and the discussion above, that many variations and configurations may be utilized to accomplish the function of the back-lighting system including lamp 46, reflective surface 44, diffuser 42 and Fresnel lens 48. These configurations can be selected depending on desired display characteristics, as well as other system considerations. Such system considerations may include; for example, the application for which display assembly 32 is used, and whether any size, weight, or power constraints exist; the type of LCD panel used; fabrication and manufacturing processes and technologies available to the manufacturer; cost constraints; and many other considerations which are now readily apparent to the reader.

Turning now to various applications for the display assembly of the present invention, it will be apparent that the invention has particular synergy in at least two general types of applications: 1) those where power is limited, and 2) those where private viewing is desirable. While many such applications exist, several examples will be discussed below.

Referring now to FIGS. 7 and 7A, a digital, personal data communicator (PDC) 80 is shown, such as may be used for wireless or cellular data communications. Examining first FIG. 7, PDC 80 is sized to be handheld, measuring 2"×2"× 9", approximately the size of a telephone hand-set. PDC 80 includes an LCD panel 82, an rf antenna 84, and a keypad 86 supporting a variety of data entry keys 88.

As is best shown in FIG. 7A, PDC 80 includes a display assembly 90 constructed in accordance with the present invention. Display assembly 90 includes LCD panel 82, a diffuser 92 overlying the back of the LCD panel, and a Fresnel lens 94 overlying the back of the diffuser. A fluorescent tube lamp 96 is positioned behind Fresnel lens 94. A reflector 98 partly surrounds lamp 96, with its opening directed towards the back surface of Fresnel lens 94. A battery 100 is provided for powering PDC 80, including lamp 96. LCD panel drive electronics 102 are provided for displaying data and images on LCD panel 82.

Further included (but not shown) within PDC 80 are rf transmitting and receiving electronics, connected to antenna 84 for transmitting and receiving data, as well as calculating and/or computing electronics for manipulating data and/or images within the PDC. Both of these elements can be selected from conventional componentry, depending on the specific application to which the PDC is to be applied.

In operation, lamp 96 is powered to provide illumination, the illumination being directed by reflector 98 towards Fresnel lens 94. Fresnel lens 94 images the lamp through diffuser 92 and LCD panel 82, providing illumination for the panel. Diffuser 92 diffuses the light passing through the Fresnel lens to obtain light uniformity. In the same manner as described hereinabove, the region of illumination provided by the light passing through LCD panel 82 is selected to optimize the function of PDC 80. For example, to minimize power consumption while still providing a reasonably sufficient viewing area, it may be desirable to select a collimated illumination region as shown in FIG. 3E above. If privacy is desired, a restricted viewing region will be selected, as described with respect to FIG. 3F above.

PDC 80 is well suited, for example, to manipulating private data, such as stock data, in a public environment.

Further, if the shape of the case for PDC 80 were altered slightly to resemble a flattened chart configuration, PDC 80 would be well-suited for processing private medical data, such as a nurse or physician might enter onto a patient's chart during examination rounds.

PDC 80 is further intended to illustrate that the present invention is not just suitable for large-screen applications such as the portable computer display described above. It is also readily utilized to provide a much smaller display, such as that shown in PDC 80. In fact, since the sizes of the components comprising the present inventive display assembly scale down with the size of the LCD panel, the present invention can be implemented with very small LCD panels, such as those that are found on LCD wristwatches.

Figure 8:
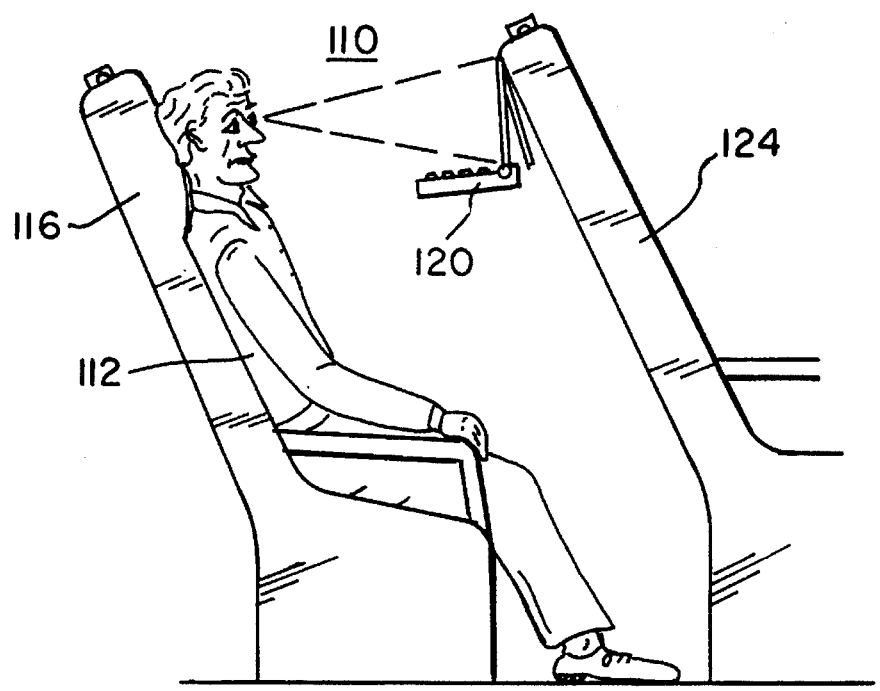
FIG. 8 is a side view illustrating the display assembly of the present invention used in an airplane passenger environment.
Figure 8A:
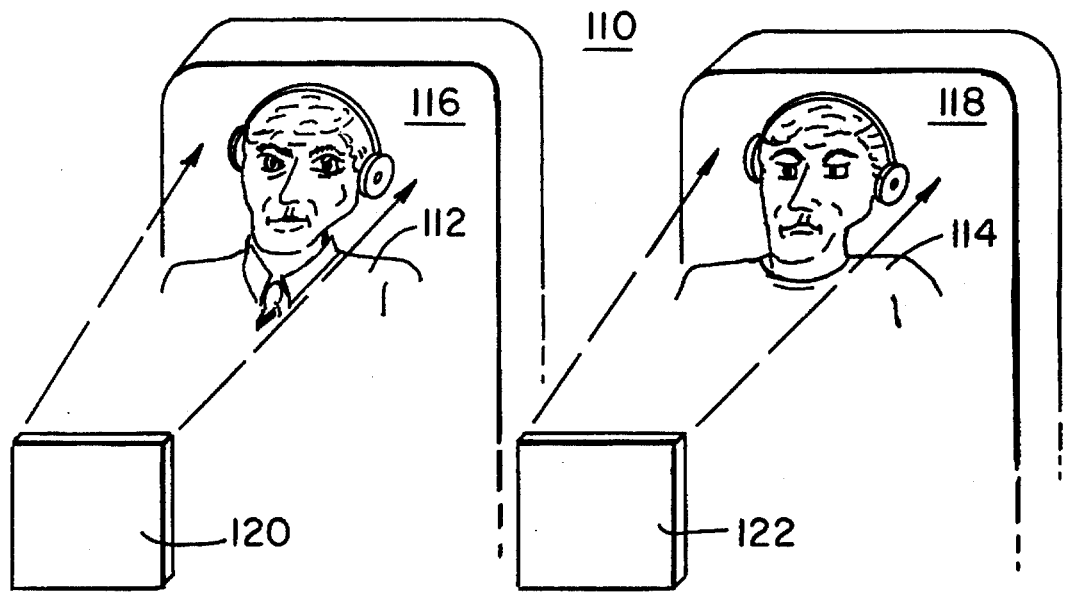
FIG. 8A is a front view of the passengers and viewing screen illustrated in FIG. 8.

Discussing now FIGS. 8 and 8A, there is shown a portion 110 of a passenger compartment in a commercial airplane. To illustrate yet another application for the present invention, passengers 112, 114, in adjacent seats 116, 118, are each provided with their own viewing screen. More specifically, in the present embodiment, passenger 112 has available a viewing screen 120 positioned in the seatback of a forward chair 124, while passenger 114 has a separate viewing screen 122 likewise positioned in the facing seatback.

While viewing screens 120, 122 are shown schematically, they are substantially identical to display assembly 32 of FIG. 1, with the exception that the power and signal/electronic driver circuitry may be located outside of the assembly. More specifically, power may be centrally supplied. The electronic drive circuitry may be placed where convenient, for example in the viewing screen, or in the seatback, or at a convenient remote location. Viewing screens 120, 122 are constructed to provide relatively private viewing for respective passengers 112, 114.

In operation, various selectable media such as news displays, book displays, or movies are made available at the choice of the passengers for viewing during a flight. Due to the private viewing area provided by the display assemblies of the present invention, each passenger may select a different viewing choice, without interference with a neighboring passenger. If necessary, ear-phones may be provided for audio.

Figure 10:
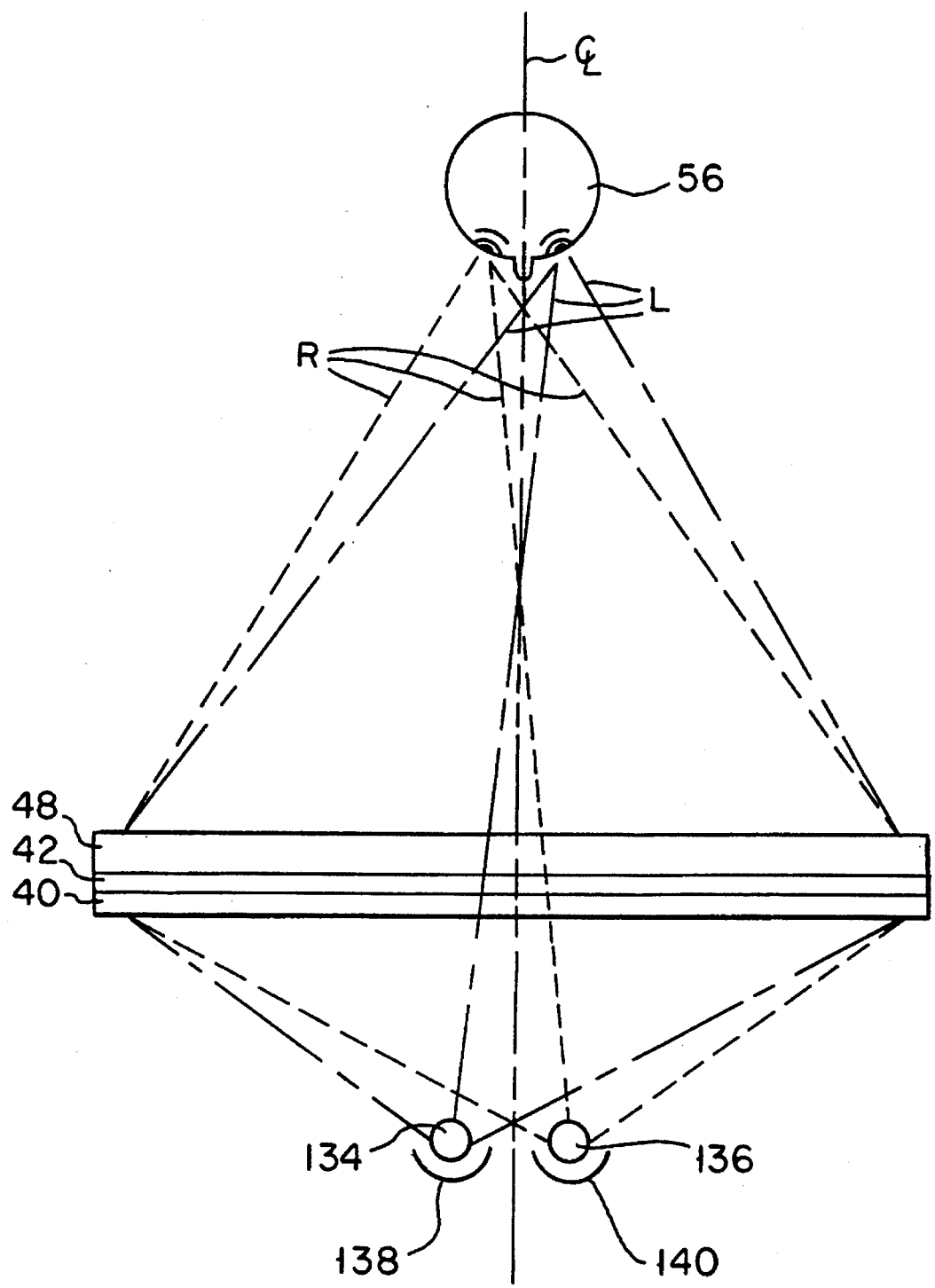
FIG. 10 is an optical schematic showing the components of the display assembly of FIG. 9 and their function relative to a human viewer.

Referring now to FIGS. 9 and 10, there is shown another embodiment of the present invention wherein a display assembly 130 is adapted to provide stereo-optic, or 3-dimensional (3D) viewing. For purposes of illustrating the present invention, display assembly 130 is shown implemented in a portable computing system 132 substantially identical to system 30 shown and described with respect to FIG. 1. Like elements are indicated by like reference numbers.

Describing now the differences between the present embodiment and system 60 (FIG. 1), in the present embodiment, light source 46 (FIG. 1) has been removed, and replaced by a pair of lamps 134, 136. Lamps 134, 136 are shown mounted on the axis of lamp 46 (FIG. 1), and are spaced apart a distance D, so as to be imaged into the eyes of a viewer 56. Distance D thus comprises the distance between the eyes of viewer 56, as adjusted for the magnifying effect provided by imaging through Fresnel lens 48. Each lamp 134, 136 is surrounded by a reflector, indicated respectively at 138, 140. Reflectors 140, 138 are positioned so as to direct light from the lamps towards reflecting surface 44, and thence through Fresnel lens 48 and diffuser 42, the latter two elements positioned in a stack on the back of LCD panel 40 in the manner described hereinabove. Fresnel lens 48, diffuser 42, and lamps 134, 136 are relatively positioned so as to image the lamps, respectively, into the left and right eyes of viewer 56.

Further in contrast to system 30 (FIG. 1), LCD panel drive circuit 54 has been effectively altered, either physically or electronically, to provide two discrete driving circuits, 54A and 54B, each of which provides different electrical signals to panel 40.

A switch 142, connected to and synchronized by driving circuits 54A and 54B, is provided intermediate power supply 52 and lamps 134, 136, permitting the operation of the lamps to be synchronized with the operation of the data in the driving circuits.

In all other respects, system 132 is identical to system 30 (FIG. 1).

In operation, driving circuit 54A is utilized as a buffer to provide a left-eye signal to lamp 134, while driving circuit 54B is utilized as a buffer to provide a right-eye signal to lamp 136. Switch 142 synchronizes the operation of lamps 134, 136, so that lamp 134 is illuminated when the left-eye data is displayed on LCD panel 40, and lamp 136 is illuminated when the right-eye data is displayed on the LCD panel.

The switching of left-eye, right-eye data supplied to panel 40, and the synchronized illumination of lamps 134, 136, is performed at a rate exceeding 30 Hz, and preferably exceeding 60 Hz, whereby the changes are essentially invisible to human viewer 56.

For purposes of explanation, FIG. 10 (which illustrates the system in an optically schematic manner) shows left eye illumination indicated by the longer-dashed light rays labeled L, while right eye illumination is indicated by the shorter-dashed light rays labeled R.

With human viewer 56 positioned at a fixed location in front of display assembly 130, when lamp 134 is illuminated, the left eye illumination L is focused by Fresnel lens 48, through the left-eye transmissive data on LCD panel 40, into the viewer's left eye. Similarly, when lamp 136 is illuminated in synchronism with the right-eye transmissive data being displayed on LCD panel 40, Fresnel lens 48 focuses the right-eye illumination R into the right eye of the human viewer. While the appropriate position is maintained relative to display system 132, viewer 56 will thus see stereo-optic or 3-D images.

The present invention, due to the focusing effect of the Fresnel lens, is thus readily adapted to provide such stereo-optic, or 3D, viewing for a human viewer.

While the stereo-optic capability has been illustrated as implemented in a portable computing system, it is understood that it can be readily implemented in any assembly capable of supporting a transmissive data display. Applications for such a stereo-optic display assembly include, for example, video games and movie viewing screens. Many other applications wherein such stereo-optic viewing is desirable will be readily apparent to the reader.

While the stereo-optic display assembly shown in FIGS. 9 and 10 functions effectively and is economical to provide, it requires the viewer to maintain a relatively steady viewing position to appreciate the full 3D effects.

Figure 11:
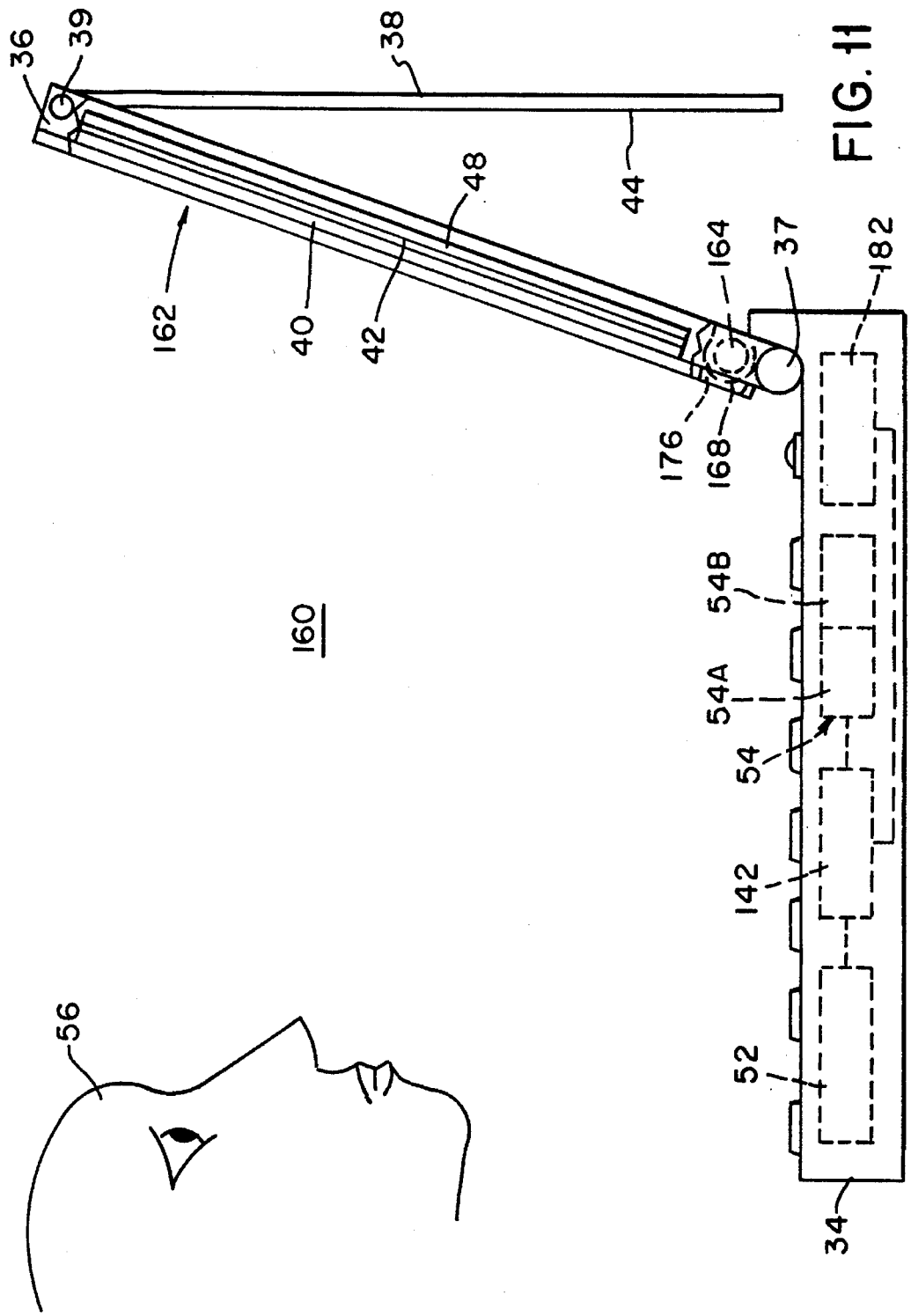
FIG. 11 is a side view, partly schematic, of another alternate embodiment of the present invention.
Figure 12:
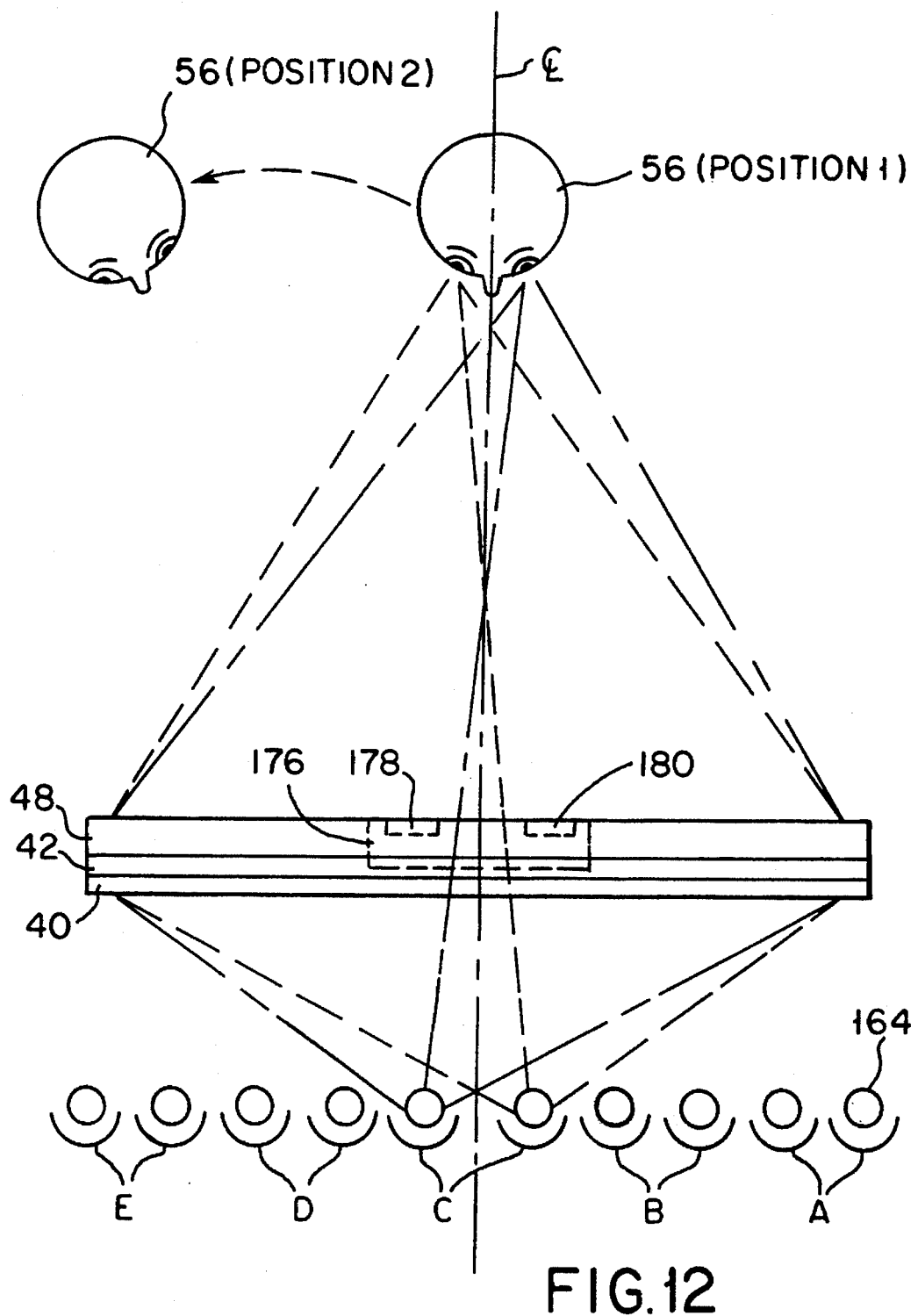
FIG. 12 is an optical schematic showing the components of the display assembly from FIG. 11 and their function relative to a human viewer.

With reference now to FIGS. 11 and 12, a portable computing system 160 including a stereo-optic display assembly 162 is shown wherein the system is adapted to provide a stereo-optic display while the human viewer is moving, for example, between a position #1 to a position #2. Like elements to those of system 132 (FIGS. 9 and 10) are indicated by like reference numbers.

Comparing now system 160 to system 132 (FIGS. 9, 10), lamps 134, 136 have been removed and lamp array 164 substituted therefor. Lamp array 164 contains 10 lamps, indicated at A–J, each lamp being surrounded by its own appropriate reflector, 168, respectively, positioned to reflect light off of mirrored surface 44 and onto the back of display assembly 162.

Mounted in frame 36, centered in the horizontal dimension underneath of LCD panel 40, is a distance sensing circuit 176, including a pair of ultrasonic distance sensors 178, 180. A calculating circuit 182 is contained in base 34 and connected to the output of sensors 178, 180, for calculating by triangulation the position of viewer 56 relative to display assembly 162. It will be appreciated that such position sensing apparatus, operating by triangulation based on distance sensors, is known in the art. Calculating circuit 182 is connected in turn to switch 142.

In operation, distance sensing circuit 176 and calculating circuit 182 are used to determine the position of human viewer 56 relative to display assembly 162. Drive circuits 54A, 54B are synchronized with power supply 52 through switch circuit 142 for displaying left-eye and right-eye data in the manner described above. Calculating circuit 182 likewise provides viewer position information to switch 142.

Provided with viewer position data in addition to the left-eye, right-eye display data, switch 142 operates to illuminate the appropriate pair of lamps A–J within lamp array 164, such that the illumination for the correct left- and right-eye data is always focused at the correct position for viewer 56. Thus, the left- and right-eye illumination will always be focused at the position of the corresponding eyes of human viewer 56, even while the viewer is moving, for example from position #1 to position #2, relative to display assembly 162.

There is thus provided not only stereo-optic viewing, but stereo-optic viewing dynamically responsive to the position of the human viewer. While slightly more complex than the stere-optic viewing assembly shown with respect to system 160 (FIGS. 9 and 10), the present embodiment is more adaptable in that it provides for motion of the human viewer.

There has thus been provided a transmissive data display utilizing an imaging lens so as to yield a selectable illumination area and hence a selectable viewing angle and area. The system provides a bright, high-resolution display while utilizing a fraction of the power required to drive a conventional display. Further, the system may be used to provide a narrow area of illumination, yielding both a very private viewing area and even lower power consumption. The viewing system can be fabricated using conventional, economical components. It is adaptable to a variety of applications, several of which have been described above. It is readily scaled in size and shape. The viewing system is also readily adaptable in different configurations to provide stereo-optic and 3D viewing.

While the invention has been shown and described with respect to specific embodiments, it is not thus limited. Numerous modifications, changes and improvements will occur to those skilled in the art, all of which fall within the contemplation of the present invention.

What is claimed is:

1. Back-lighted display apparatus having a light source of reduced intensity and power consumption, comprising:

display means having a predetermined area for continuously displaying a current frame of transmissive data for a period longer than human eye persistence;

a light source for continuously generating flood light of predetermined intensity; and optical imaging means disposed between said light source and said display means for imaging said light source through said display means onto an image plane on an opposite side of said display means for direct viewing simultaneously by both eyes of a human positioned at said image plane;

the intensity of said light source being appropriate for direct human viewing of said transmissive data, wherein the intensity and power consumption of said light source are reduced as a consequence of light concentration in said image plane by said optical imaging means.

2. Apparatus in accordance with claim 1 and further including diffuser means disposed between said light source and said display means for diffusing said light.

3. Apparatus in accordance with claim 1 wherein said optical imaging means comprises a positive lens.

4. Apparatus in accordance with claim 3 wherein said positive lens comprises a circular Fresnel lens.

5. Back-lighted display apparatus having a light source with reduced power consumption, comprising:

display means having a predetermined generally planar area for continuously displaying a current frame of transmissive data for a period longer than human eye persistence;

a light source for continuously generating flood light of predetermined intensity;

a circular Fresnel lens disposed between said light source and said display means, said circular Fresnel lens imaging said light source through said display means and onto an image plane on an opposite side of said display means for direct viewing simultaneously by both eyes of a human positioned at said image plane; and diffusing means disposed between said light source and said display means for diffusing said light;

the intensity of said light source being appropriate for direct human viewing of said transmissive data, wherein the power consumption of said light source is reduced as a consequence of light concentration in said image plane by said circular Fresnel lens.

6. Apparatus in accordance with claim 5 wherein said Fresnel lens is selected to have a focal length in the range of about 15–20 cm.

7. Apparatus in accordance with claim 5 wherein said diffusing means comprises a small-angle diffuser.

8. Apparatus in accordance with claim 5 wherein said display means comprises a liquid crystal display panel.

9. Apparatus in accordance with claim 5 wherein said light source comprises a fluorescent lamp.

10. Apparatus in accordance with claim 5 wherein said diffuser means and said Fresnel lens are positioned adjacent to said display means.

11. Apparatus in accordance with claim 5 wherein:

said light source includes a reflecting surface; and said diffusing means is disposed on said reflecting surface.

12. Apparatus comprising;

a transmissive display having a predetermined generally planar area for displaying transmissive data;

a light source for generating light of predetermined intensity;

a small-angle light diffuser positioned intermediate said light source and said transmissive display for diffusing said light;

a circular Fresnel lens disposed between said light source and said transmissive display for imaging said light source through said transmissive display onto an image plane on an opposite side of said display means for direct viewing by a human eye positioned at said image plane;

the intensity of said light source being appropriate for direct human viewing of said transmissive display at a distance in the range of about 20 cm to 200 cm; and wherein said transmissive display, said light source, said diffuser and said Fresnel lens are relatively positioned to provide a region of diverging illumination for a human viewer.

13. Apparatus comprising:

a transmissive display having a predetermined generally planar area for displaying transmissive data;

a light source for generating light of predetermined intensity:

a small-angle light diffuser positioned intermediate said light source and said transmissive display for diffusing said light;

a circular Fresnel lens disposed between said light source and said transmissive display for imaging said light source through said transmissive display onto an image plane on an opposite side of said display means for direct viewing by a human eye positioned at said image plane;

the intensity of said light source being appropriate for direct human viewing of said transmissive display at a distance in the range of about 20 cm to 200 cm; and wherein said transmissive display, said light source, said diffuser and said Fresnel lens are relatively positioned to provide a region of generally collimated illumination for a human viewer.

14. Back-lighted display apparatus having a light source of reduced intensity and power consumption, comprising:

a transmissive display having a predetermined generally planar area for displaying transmissive data;

a light source for continuously generating flood light of predetermined intensity;

a small-angle light diffuser positioned intermediate said light source and said transmissive display for diffusing said light;

a circular Fresnel lens disposed between said light source and said transmissive display for imaging said light source through said transmissive display onto an image plane on an opposite side of said display means for direct viewing simultaneously by both eyes of a human positioned at said image plane; and the intensity of said light source being appropriate for direct human viewing of said transmissive display at a distance in the range of about 20 cm to 200 cm, wherein the intensity and power consumption of said light source are reduced as a consequence of light concentration in said image plane by said circular Fresnel lens.

15. Apparatus in accordance with claim 14 wherein said transmissive display comprises a liquid crystal display panel.

16. Apparatus in accordance with claim 14 integrated into a portable computing system, said computing system further comprising:

data entry means;

battery means for providing power to said light source; and means for providing electronic signals to said transmissive display whereby to generate data or images on said transmissive display.

17. Apparatus in accordance with claim 14 wherein said transmissive display, said light source, said diffuser and said Fresnel lens are relatively positioned to provide a region of narrowed illumination for private viewing of said data by a human viewer.

18. Apparatus in accordance with claim 14 wherein said Fresnel lens is selectively removable from said apparatus.

19. Apparatus in accordance with claim 14 incorporated into a portable communications device further including:

means for entering data; and means for transmitting data to a remote location.

20. Apparatus in accordance with claim 14 incorporated into an airplane passenger compartment for providing personal viewing for an airline passenger.

21. A method for displaying data, comprising the steps of:

displaying transmissive date;

providing a light source of predetermined intensity; and imaging said light source through said transmissive data onto an image plane on an opposite side of said transmission data for direct viewing simultaneously by both eyes of a human positioned at said image plane;

the intensity of said light source being appropriate for direct human viewing of said transmissive data.

22. A method in accordance with claim 21 and further including the step of diffusing said light before said light is imaged through said transmissive data.

23. A method comprising the steps of:

displaying transmissive data in a predetermined, generally planar area;

providing a light source for generating light of predetermined intensity;

diffusing said light; and imaging said light source, using a circular Fresnel lens, through said transmissive data and onto an image plane on an opposite side of said transmissive data for direct viewing simultaneously by both eyes of a human positioned at said image plane;

the intensity of said imaged diffused light source being appropriate for direct human viewing of said transmissive data, wherein the intensity and power consumption of said light source are reduced as a consequence of light concentration in said image plane by said circular Fresnel lens.

24. A method comprising the steps of:

displaying transmissive data in a predetermined planar area of a transmissive display screen;

providing a light source for generating light of predetermined intensity;

diffusing said light; and imaging said light source, using a circular Fresnel lens positioned between said light source and said transmissive display screen, through said transmissive display screen and onto an image plane on an opposite side of said transmissive data for direct viewing simultaneously by both eyes of a human positioned at said image plane;

the intensity of said diffused imaged light source being appropriate for direct human viewing of said transmissive display screen at a distance in the range of about 20 cm to 200 cm, wherein the power consumption of said light source is reduced as a consequence of light concentration in said image plane by said circular Fresnel lens.

25. A portable computing system comprising;

a portable case including a cover for supporting a display assembly;

a battery contained in said case for providing power for said portable computing system;

an input device for providing electronic data to said portable computing system;

an electronic circuit for processing said electronic data;

said display assembly comprising:

> display means having a predetermined generally planar area for displaying said electronic data;
>
> a light source for generating light of predetermined intensity;
>
> a circular Fresnel lens disposed between said light source and said display means, said circular Fresnel lens imaging said light source through said display means and onto an image plane on an opposite side of said display means for direct viewing simultaneously by both eyes of a human positioned at said image plane; and diffuser means disposed between said light source and said display means for diffusing said light;

the intensity of said light source being appropriate for direct human viewing of said electronic data, wherein the power consumption of said light source is reduced as a consequence of light concentration in said image plane by said circular Fresnel lens.

\* \* \* \* \*